(12) United States Patent
Harris

(10) Patent No.: US 8,555,995 B2
(45) Date of Patent: Oct. 15, 2013

(54) THREE-POINT FRONT HITCH MOUNTABLE TO THE FRAME OF AN AGRICULTURAL TRACTOR

(76) Inventor: Jerry Harris, Burbank, WA (US)

( * ) Notice: Subject to any disclaimer, the term of this patent is extended or adjusted under 35 U.S.C. 154(b) by 0 days.

(21) Appl. No.: 12/959,464

(22) Filed: Dec. 3, 2010

(65) Prior Publication Data

US 2012/0138321 A1 Jun. 7, 2012

(51) Int. Cl.
*A01B 59/04* (2006.01)
*E02F 3/00* (2006.01)

(52) U.S. Cl.
USPC .......................................... 172/810; 172/439

(58) Field of Classification Search
USPC ......... 172/439, 272, 396, 445, 467, 451, 248, 172/450, 447, 810, 811; 280/416.2, 479.2, 280/481, 504, 510, 511; 414/703
See application file for complete search history.

(56) References Cited

U.S. PATENT DOCUMENTS

| | | | |
|---|---|---|---|
| 1,379,399 A | 5/1921 | Ferguson | |
| 3,201,878 A * | 8/1965 | Markwardt | 37/231 |
| 3,561,789 A * | 2/1971 | Stikeleather et al. | 172/272 |
| 4,015,855 A * | 4/1977 | Murray | 280/416.2 |
| 4,088,340 A * | 5/1978 | Joyce, Jr. | 280/481 |
| 4,519,623 A * | 5/1985 | Orthman | 172/439 |
| 5,029,650 A * | 7/1991 | Smit | 172/5 |
| 5,346,018 A | 9/1994 | Koster | |
| 5,360,070 A * | 11/1994 | Milton | 172/6 |
| 5,697,454 A | 12/1997 | Wilcox et al. | |
| 5,975,216 A | 11/1999 | Gibbons | |
| 6,089,328 A * | 7/2000 | Moore et al. | 172/447 |
| 6,257,347 B1 | 7/2001 | Campisi | |
| 6,431,288 B1 | 8/2002 | Hoffart | |
| 6,443,236 B2 * | 9/2002 | Staude | 172/439 |
| 6,758,285 B2 * | 7/2004 | Ollefs | 172/439 |
| 6,769,496 B2 * | 8/2004 | Casali et al. | 172/439 |
| 6,830,110 B2 | 12/2004 | Schlesser et al. | |
| 6,915,862 B2 * | 7/2005 | Deves et al. | 172/448 |
| 6,991,042 B2 * | 1/2006 | Ochi et al. | 172/439 |
| 7,377,330 B2 * | 5/2008 | Mickelson et al. | 172/450 |
| 7,658,235 B2 * | 2/2010 | Dahl et al. | 172/449 |
| 7,690,439 B2 | 4/2010 | Priepke et al. | |
| 7,784,558 B2 | 8/2010 | Mozingo | |
| 7,874,391 B2 * | 1/2011 | Dahl et al. | 180/89.12 |
| 2001/0022226 A1 * | 9/2001 | Staude | 172/439 |
| 2006/0016611 A1 * | 1/2006 | Chauvel | 172/439 |
| 2008/0035356 A1 * | 2/2008 | Dahl et al. | 172/439 |
| 2012/0085559 A1 * | 4/2012 | Schwalenberg et al. | 172/439 |

* cited by examiner

*Primary Examiner* — Arpád Fábián-Kovács
(74) *Attorney, Agent, or Firm* — Angus C. Fox, III

(57) ABSTRACT

A three-point hitch mountable to the front frame of an agricultural tractor includes a main backing member, an upper hitch-point anchor bracket having four sets of securing pin anchoring positions that is welded to the main backing member, a pair of spaced-apart pivot anchors welded to the main backing member, an A-frame assembly pivotably installed between the pivot anchors, and a hydraulic cylinder which raises and lowers the A-frame assembly operably coupled to one of the middle sets of pin anchoring positions and the A-frame assembly. An implement can be connected to the upper-most anchoring position and the distal ends of the A-frame assembly. The three-point hitch can be converted to a ball hitch by re-pinning the hydraulic cylinder to the upper-most anchoring position, raising the A-frame assembly about ninety degrees and pinning it to the anchor bracket.

18 Claims, 9 Drawing Sheets

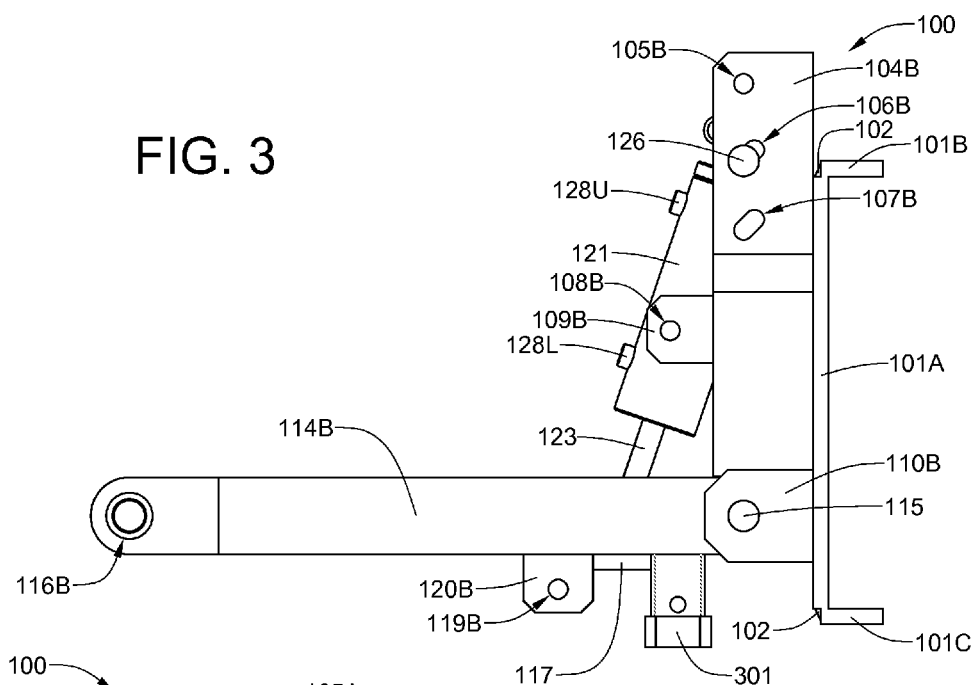

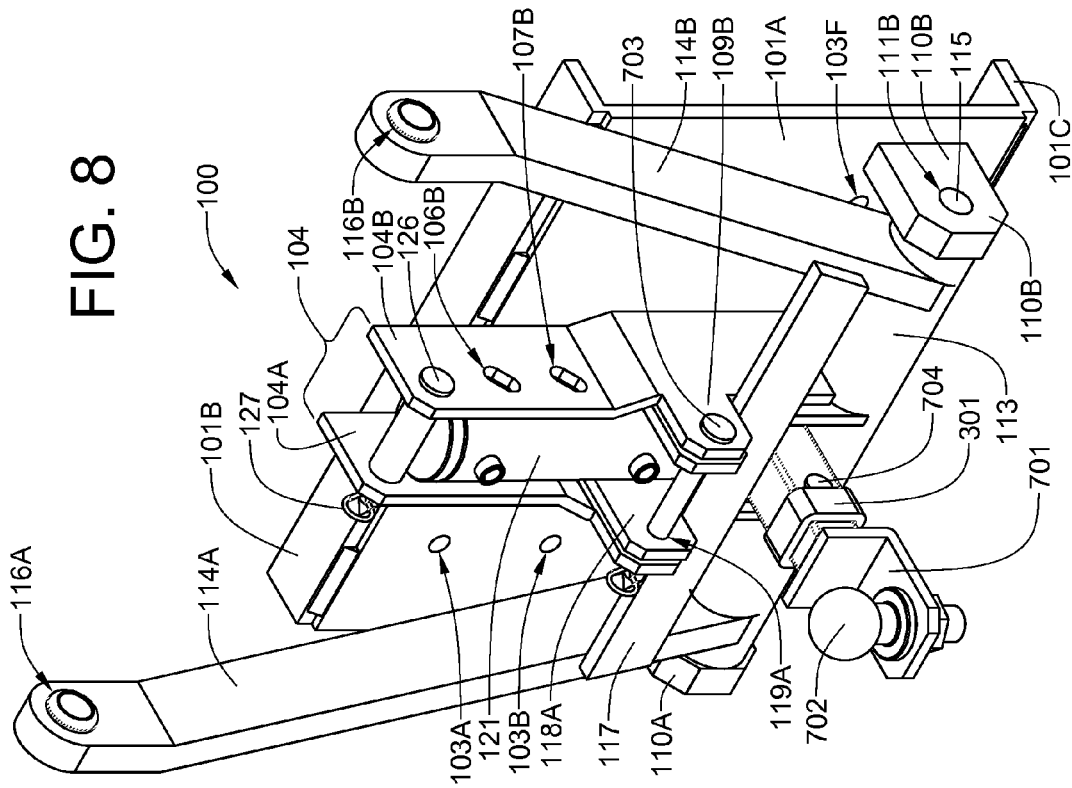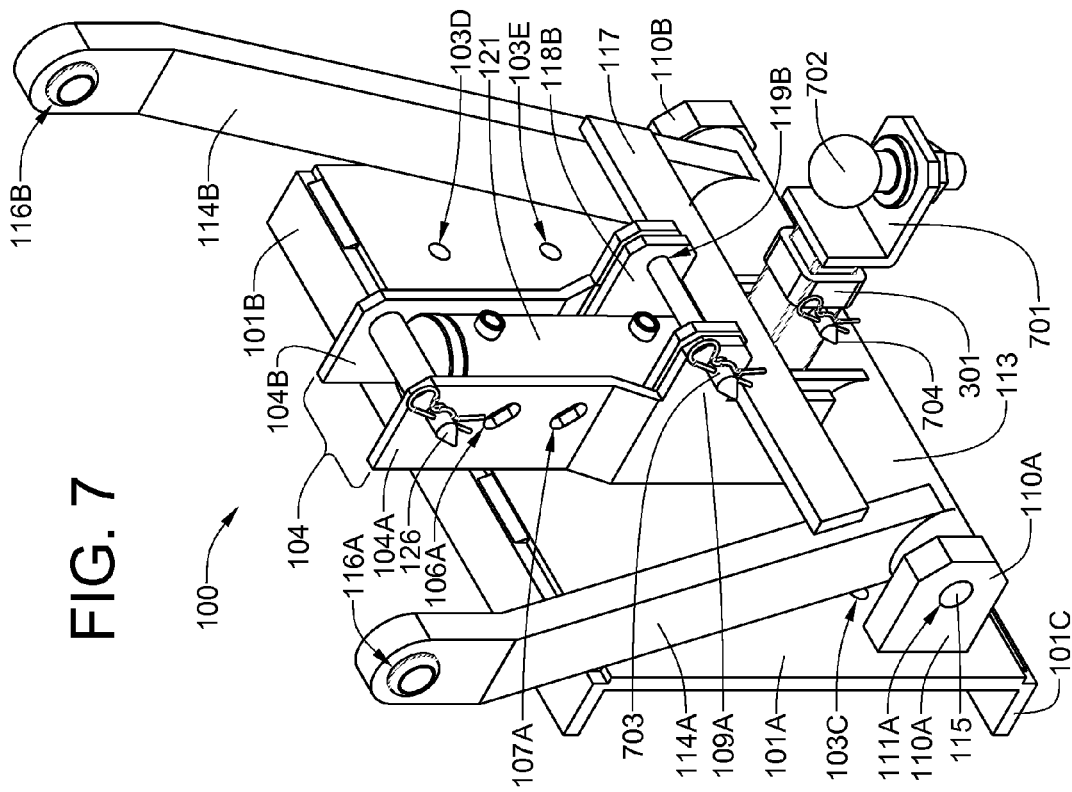

THREE-POINT FRONT HITCH MOUNTABLE TO THE FRAME OF AN AGRICULTURAL TRACTOR

BACKGROUND OF THE INVENTION

1. Field of the Invention

This invention relates generally to tractor hitches and, more particularly, to three-point front hitches mountable to the tractor frame.

2. History of the Prior Art

In 1926, a revolutionary 3-point hitch for farm tractors was patented by Harry Ferguson in Britain. The 3-point hitch transferred stress and weight to the back wheels, in conjunction with the hydraulics system. Harry Ferguson's infamous handshake agreement with Henry Ford was the precursor to the Ford 9n tractor in 1939. Utilizing Fergusons hydraulic system along with his three-point hitch gave Ford the advantage over the competition. Others were forced to introduce a competitive hitch. Once Fergusons patents expired the three-point hitch became the industry standard. John Deere began offering a three-point hitch that was compatible with standard three-point implements with the introduction of the 20 series two cylinder tractors in 1956. John Deere 520 and 620 tractors utilized a unique three-point design. The 720 John Deere Tractor used the same design, however the draft link supports are larger than the 520 and 620 John Deere three-point Hitch. Draft links, otherwise known as elephant ears, have an unusual shape. The John Deere 520 and 620 tractors were ahead of the 530 and the 630 tractors, with the three point hitch. The 720 was followed by the John Deere 730. In 1960, John Deere ended 2 cylinder production. In 1961, these tractors were replaced by 4, 6 and 8 cylinder models. In use for only 5 years, many of these tractor components became obsolete. John Deere three-point hitches are offered on the aftermarket.

SUMMARY OF THE INVENTION

The present invention provides a three-point hitch assembly mountable to the front portion of the frame of an agricultural tractor. The hitch includes a main backing member that is attachable to the front frame of the tractor. An upper hitch-point anchor bracket is formed from a first pair of parallel, spaced-apart plates, which are welded to the main backing member. Each of the spaced-apart plates has four spaced-apart apertures, each of which is coaxial with an aperture in the other plate. Thus, the upper hitch-point anchor bracket is equipped with four pairs of coaxial apertures. The uppermost pair of apertures is used for attachment of the upper hitch attachment point of an attachable implement. The middle two pairs and the lower pair of apertures will be hereinafter described. A pair of spaced-apart pivot anchors are also welded to the main backing member. Each of the pivot anchors has an aperture that is coaxial with an aperture on the other pivot anchor. A A-frame assembly includes a pivot tube to which are rigidly attached a pair of spaced-apart arms. A pivot rod couples the pivot tube to each of the pivot apertures. At the end of each arm on the A-frame assembly is an implement pivot aperture. Each pivot aperture is couplable to a lower hitch point of an attachable implement. A brace plate is welded to and interconnects both spaced-apart arms of the A-frame assembly. A hydraulic cylinder mounting bracket is fabricated from a second pair of spaced apart plates, which are welded to both the brace plate and the pivot tube. Each plate of the hydraulic cylinder mounting bracket has a hydraulic cylinder securing pin aperture that is coaxial with the aperture on the other plate. There is also an auxiliary securing aperture pair located below the hydraulic cylinder securing pin aperture pair. A hitch receiver mounting plate is welded to both the pivot tube and the second pair of spaced-apart plates. A square tube hitch receiver, that is welded to the hitch receiver mounting plate, projects downwardly when the A-frame assembly is in a generally horizontal position. A receiver hitch can be secured within the square tube hitch receiver using a hitch pin and spring clip. A hydraulic cylinder is coupled between the upper hitch-point anchor bracket and the hydraulic cylinder mounting bracket. A first securing pin secures an upper end of the hydraulic cylinder to either of the middle two pairs of apertures in the upper hitch-point anchor bracket, and a second securing pin secures a lower portion of the hydraulic cylinder to the securing pin apertures of the hydraulic cylinder mounting bracket. Each of the middle two pairs of apertures is oblong so that the hydraulic cylinder has sufficient play to accommodate normal variations from level of the ground over which an implement, such as a weeder attachment, attached to the hitch is pulled. Without the play provided by the oblong apertures, the implement would be unable to bounce and would either cause the front of the tractor to lift or the implement to dig into the ground. The hydraulic cylinder is used to adjust the height of the pivot apertures of the A-frame assembly. In order to deploy a hitch, the securing pin is removed from one of the middle pair of oblong apertures and the upper end of the hydraulic cylinder is secured within the top aperture pair of the upper hitch-point anchor bracket, thereby causing the A-frame assembly to assume a generally vertical position. A second securing pin can be used to secure A-frame assembly in this vertical position. In this configuration, the second securing pin passes through both the lower pair of apertures in the upper hitch-point anchor bracket and the auxiliary securing pin apertures of the hydraulic cylinder mounting bracket.

BRIEF DESCRIPTION OF THE DRAWINGS

FIG. 3 is a left-side elevational view of the three-point front tractor hitch, with the A-frame assembly extended;

FIG. 4 is a right-side elevational view of the three-point front tractor hitch, with the A-frame assembly extended;

FIG. 7 is an isometric view, taken from a upper-right-front vantage point, of the three-point front tractor hitch, with the A-frame assembly retracted;

FIG. 8 is an isometric view, taken from a upper-left-front vantage point, of the three-point front tractor hitch, with the A-frame assembly retracted;

DETAILED DISCLOSURE OF THE INVENTION

The present invention will now be described in detail with reference to the attached drawing figures of the presently preferred embodiment thereof. It should be understood that although no attempt has been made to inaccurately portray the invention, the drawings may not be drawn to exact scale and are provided primarily to facilitate an understanding of the function and construction of the invention.

Figure 9:
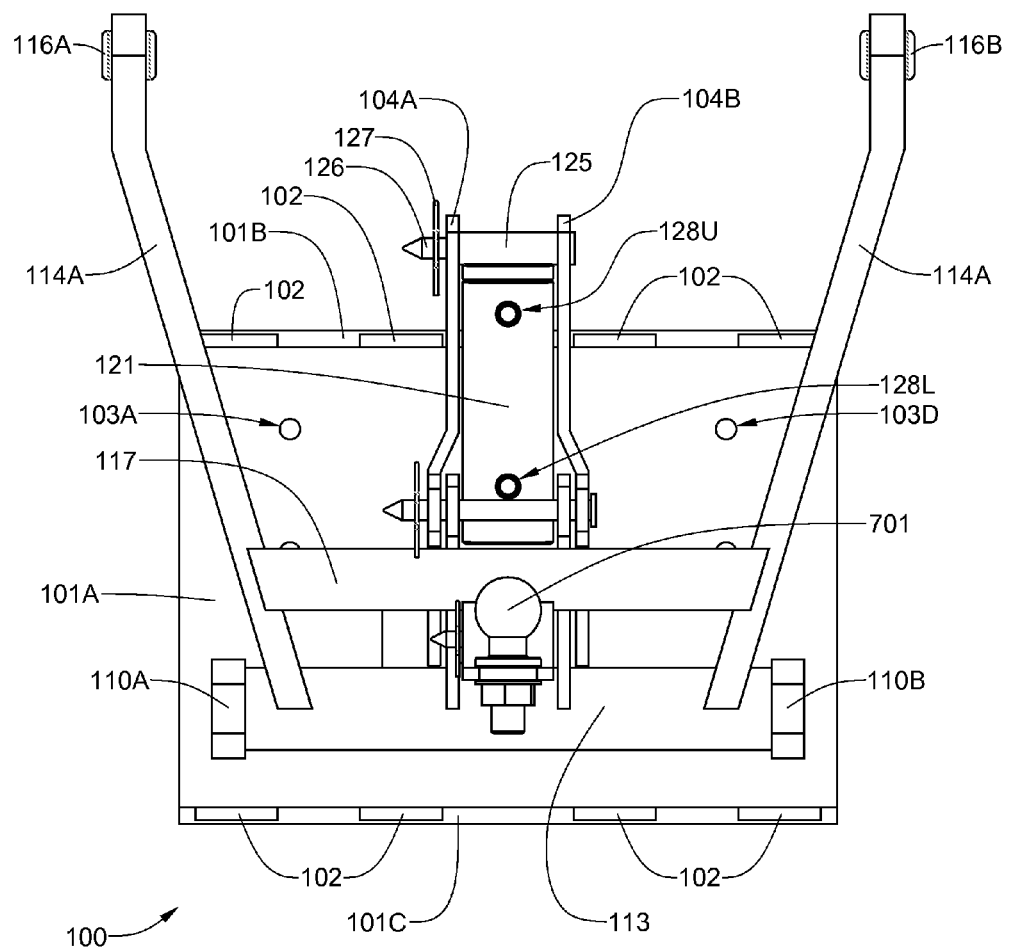
FIG. 9 is a front elevational view of the three-point front tractor hitch, with the A-frame assembly retracted.
Figure 10:
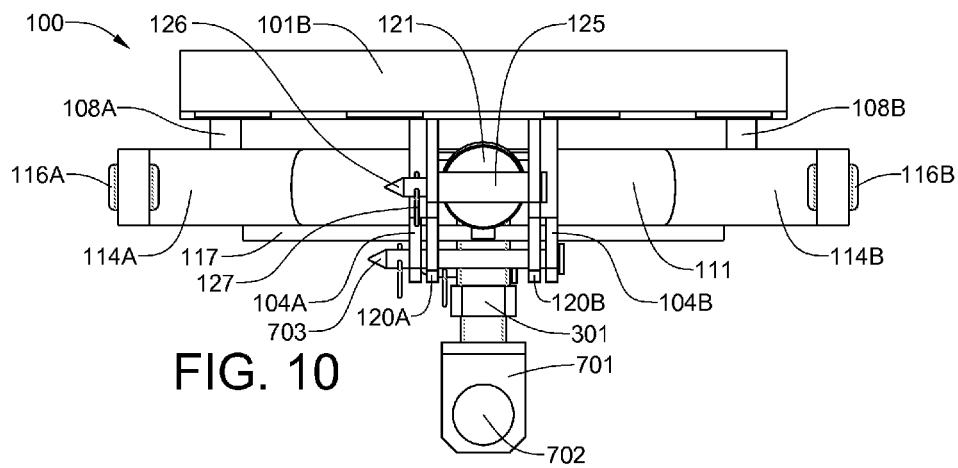
FIG. 10 is a top plan view of the three-point front tractor hitch, with the A-frame assembly retracted.
Figure 11:
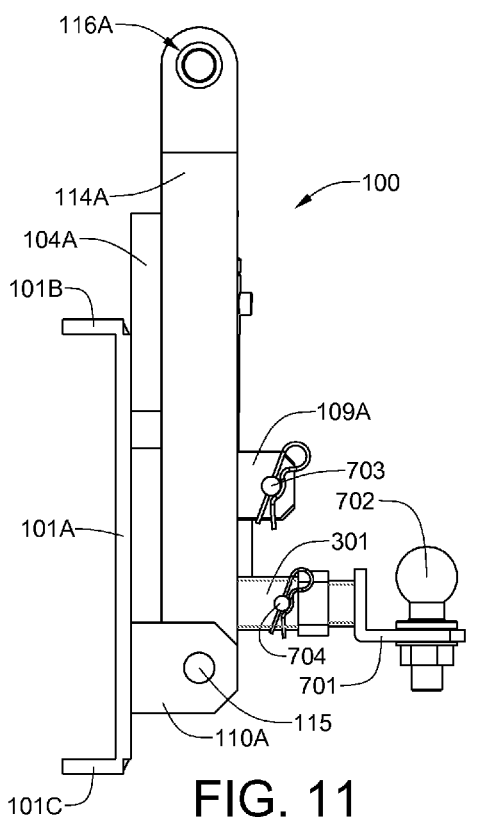
FIG. 11 is a left-side elevational view of the three-point front tractor hitch, with the A-frame assembly retracted.
Figure 12:
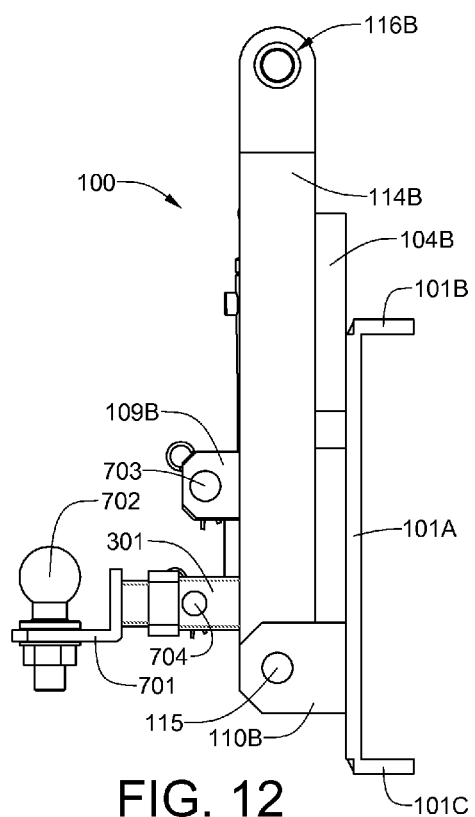
FIG. 12 is a right-side elevational view of the three-point front tractor hitch, with the A-frame assembly retracted.

Referring now to FIGS. 1 through 6, the front hitch assembly 100 includes a main backing member 101, which is a weldment fabricated from a main plate 101A, a top plate 101B and a bottom plate 101C, which are welded together with welds 102. The main backing member 101 is equipped with six apertures 103A, 103B, 103C, 103D, 103E and 103F, which enable the front hitch assembly 100 to be bolted to the front frame 1301 of a tractor (see FIG. 13) with six bolts (not shown). An upper hitch-point anchor bracket 104 is formed from a pair of parallel, spaced-apart plates 104A and 104B, which are welded to the main backing member 101. Each of the spaced-apart plates 104A and 104B has three spaced-apart apertures: On plate 104A, there is an upper cylindrical aperture 105A, an upper oblong aperture 106A, a lower oblong aperture 107A, and a lower cylindrical aperture 108A, which is positioned on tab 109A; on plate 104B, there is an upper cylindrical aperture 105B, an upper oblong aperture 106B, a lower oblong aperture 107B, and a lower cylindrical aperture 108B, which is positioned on tab 109B. Each aperture with an A suffix on plate 104A is coaxial with the aperture having a B suffix on plate 104B, which bears the same number (e.g., 105A and 105B). The set of upper cylindrical apertures 105A/105B provides an upper hitch attachment point for securing the upper link of an attachable implement. The set of upper cylindrical apertures 105A/105B also has a second function, which will be described hereinafter with reference to drawing FIGS. 7, 8 and 9. The function of the oblong apertures 106A/106B and 107A/107Bm as well as that of the lower cylindrical apertures 108A/108B will also be hereinafter described. A pair of spaced-apart pivot anchors 110A and 110B are also welded to the main backing member 101. Pivot anchor 110A has a first A-frame pivot aperture 111A that is coaxial with a second A-frame pivot aperture 111B in the other pivot anchor 110B. An A-frame assembly 112 includes a pivot tube 113, to which are rigidly attached a pair of spaced-apart arms 114A and 114B. A pivot rod 115 couples the pivot tube 113 to each of the pivot apertures 111A and 111B. At the end of each arm 114A and 114B is an implement pivot bushing 116A and 116B, respectively. Each implement pivot bushing 116A and 116B is coupleable to a lower hitch point of an attachable implement (not shown). A brace plate 117 is welded to and interconnects both spaced-apart arms 114A and 114B of the A-frame assembly 112. A hydraulic cylinder mounting bracket 118 is fabricated from a second pair of spaced apart parallel plates 118A and 118B, which are welded to both the brace plate 117 and the pivot tube 113. Each plate 118A and 118B of the hydraulic cylinder mounting bracket 118 has a securing pin aperture (not visible in the drawings), which is coaxial with the securing pin aperture in the other plate, as well as a locking aperture 119A or 119B, in downwardly-projecting tabs 120A and 120B, respectively. The locking apertures 119A/119B align with the lower cylindrical apertures 108A/108B when the A-frame assembly 112 is rotated to a generally vertical position. The A-frame assembly 112 can then be locked in the generally vertical position by inserting a locking pin (not shown) through the lower cylindrical apertures 108A/108B and the locking apertures 119A/119B. A hydraulic cylinder 121 is coupled between the upper hitch-point anchor bracket 104 and the hydraulic cylinder mounting bracket 118. A lower retainer sleeve 122, which is transversely affixed to the lower end the piston rod 123 of the hydraulic cylinder 121, is secured to the securing pin apertures in the hydraulic cylinder mounting bracket 118 with a lower securing pin 124. An upper retainer sleeve 125 affixed to the top of hydraulic cylinder 121 is secured to the upper hitch-point anchor bracket 104 through either the upper oblong apertures 106A/106B or the lower oblong apertures 107A/107B with an upper securing pin 126 and a retainer clip 127. Each of the aperture pairs 106A/106B and 107A/107B is oblong so that, even though the A-frame assembly 114 is connected to the hydraulic cylinder, it will have sufficient play to accommodate normal variations from level of the ground over which an implement, such as a weeder attachment, attached to the hitch is pulled. Without the play provided by the oblong apertures, the implement would be unable to bounce and would either cause the front of the tractor to lift or the implement to dig into the ground. The hydraulic cylinder 121 is used to adjust the tilt angle of the A-frame assembly 112 and, thus, the height of the implement pivot bushings 116A and 116B at the distal end of that assembly. The hydraulic cylinder 121 has an upper hydraulic input 128U that is coupled to a flexible hydraulic pressure hose (not shown) from the tractor's hydraulic system. When hydraulic fluid is pumped into the upper hydraulic input 128U, the internal piston (not visible) and piston rod 123 of the hydraulic cylinder 121 are extended, thereby causing the A-frame assembly 112 to rotate downwardly, which lowers the implement pivot bushings 116A and 116B. The hydraulic cylinder 121 also has a lower hydraulic input 128L that is also coupled to a flexible hydraulic pressure hose (not shown) from the tractor. When hydraulic fluid is pumped into the lower hydraulic input 128L and hydraulic fluid is allowed to flow freely from the upper hydraulic input 128U, the piston rod 123 is retracted into the hydraulic cylinder 121, thereby raising the implement pivot bushings 116A and 116B. A receiver mounting plate 129 is welded to both of the spaced-apart parallel plates 118A and 118B which form the hydraulic cylinder mounting bracket 118, and is also welded to the pivot tube 113.

Figure 1:
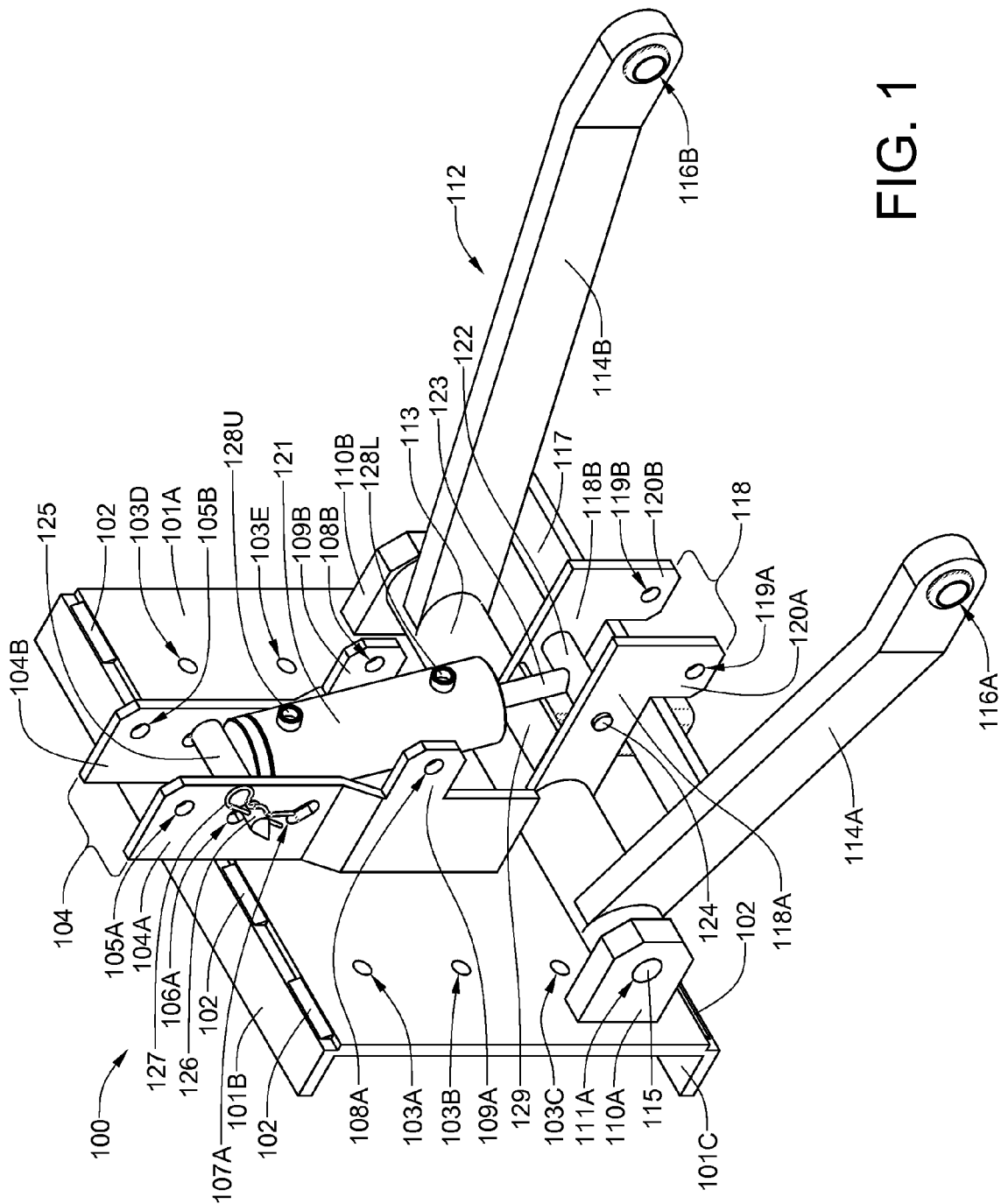
FIG. 1 is an isometric view, taken from a upper-right-front vantage point, of the three-point front tractor hitch, with the A-frame assembly extended.
Figure 2:
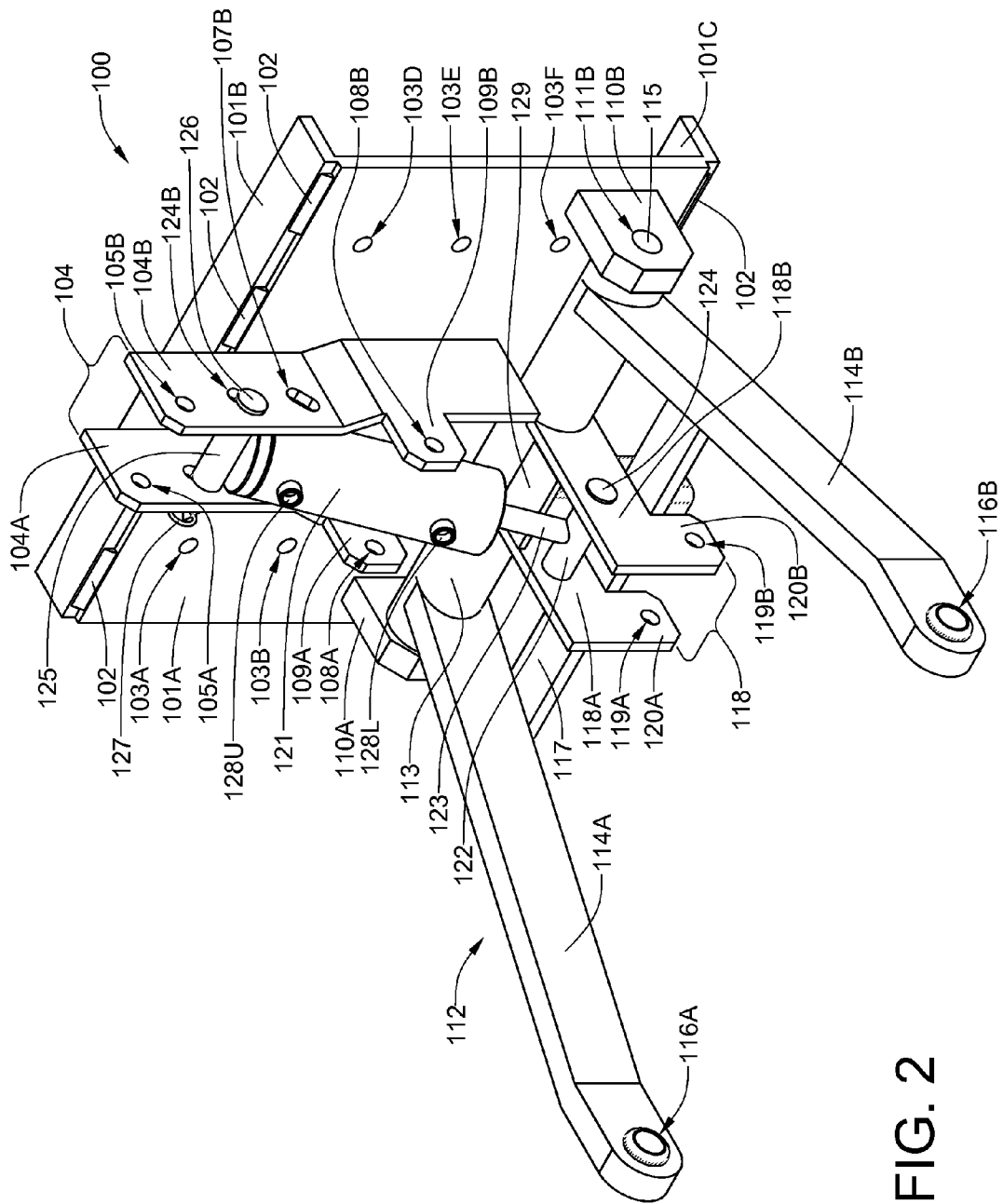
FIG. 2 is an isometric view, taken from a upper-left-front vantage point, of the three-point front tractor hitch, with the A-frame assembly extended.
Figure 5:
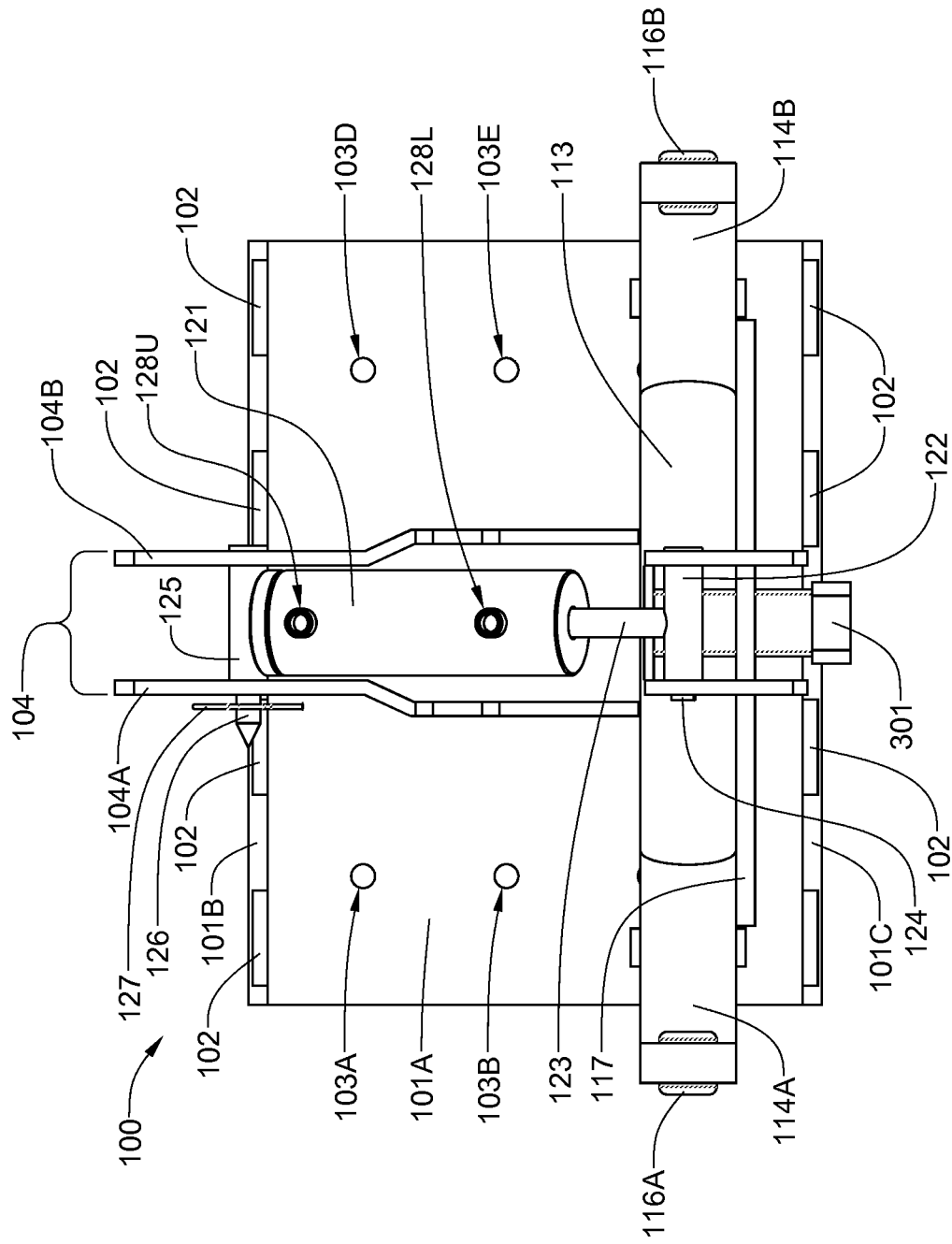
FIG. 5 is a front elevational view of the three-point front tractor hitch, with the A-frame assembly extended.

Referring now, specifically, to FIGS. 3 through 5, a square-tube hitch receiver 301 is welded to the A-frame assembly 110, to the receiver mounting plate 129, and to the brace plate 117 in a downwardly facing direction. It will be noted that a pair of coaxial apertures 302A and 302B are drilled or stamped in the square-tube hitch receiver.

Figure 6:
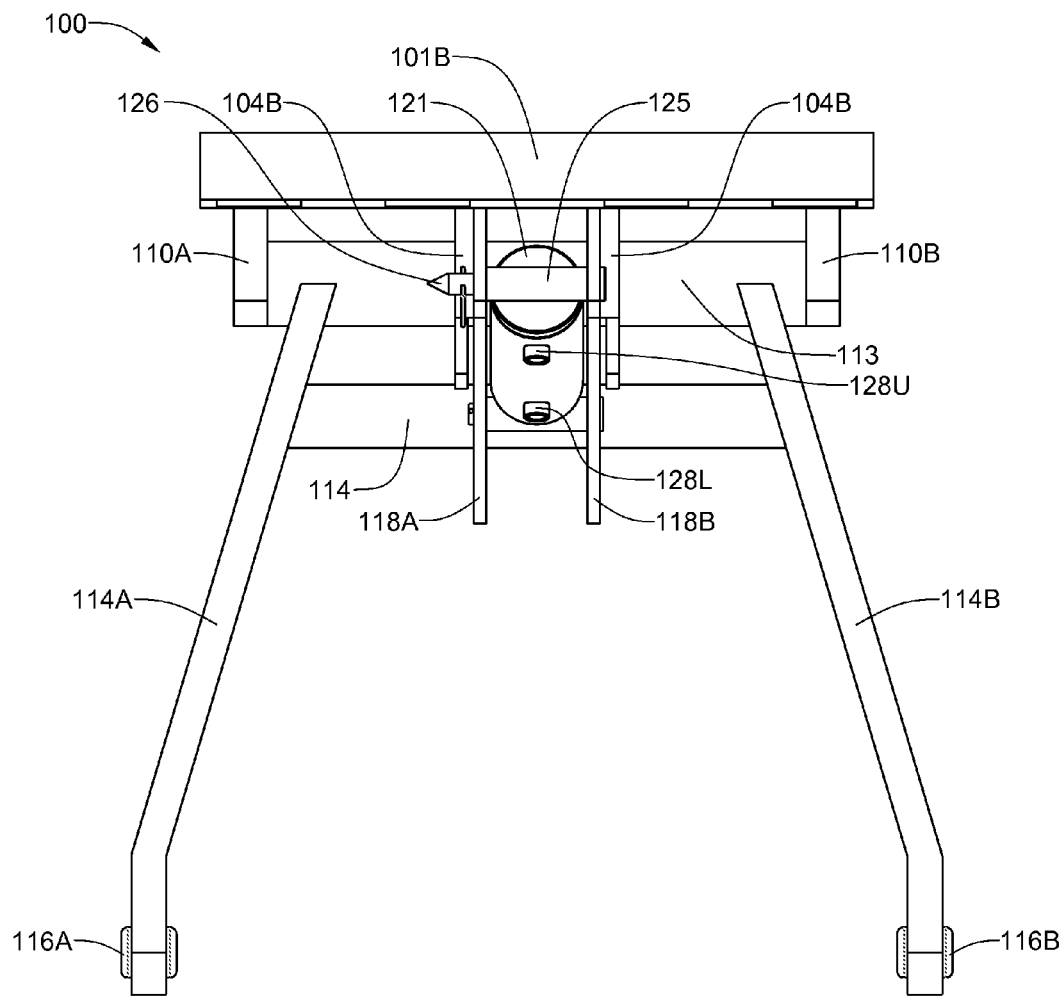
FIG. 6 is a top plan view of the three-point front tractor hitch, with the A-frame assembly extended.

Referring now to FIG. 6, the front hitch assembly is shown in a top view. Though no significant new features are seen in this view, the brace plate 117 is seen in plan view format, making it clear how effective it is at rigidifying the A-frame assembly 112.

Referring now to FIGS. 7-12, in order to rotate the hitch receiver 301 so that it is in a horizontal position, the retainer clip 127 is removed, the upper securing pin 126 is pulled from the upper retainer sleeve 125 and from either oblong aperture 106A/106B or oblong aperture 107A/107B, with the hydraulic cylinder 121 being repositioned so that the upper retainer sleeve 125 is concentric with the set of upper cylindrical apertures 105A/105B. The repositioning of the hydraulic cylinder 121 causes the A-frame assembly 112 to rotate upwardly through an arc of about 90 degrees so that the pair of spaced-apart arms 114A and 114B are about vertical. The upper securing pin 126 is replaced through the upper cylindrical apertures 105A/105B and the upper retainer sleeve 121, thereby securing the A-frame assembly 112 in its new vertical configuration. As can be seen in FIGS. 7 through 10, the hitch receiver 301 has been rotated to a horizontal configuration. A receiver insert 701 having a ball 702 secured thereto is inserted into the hitch receiver 301 and either pinned or bolted in place using apertures 302A and 302B. It is contemplated that many different types of hitches and attachments, other than ball hitches, can also be secured to the hitch receiver 301.

Figure 13:
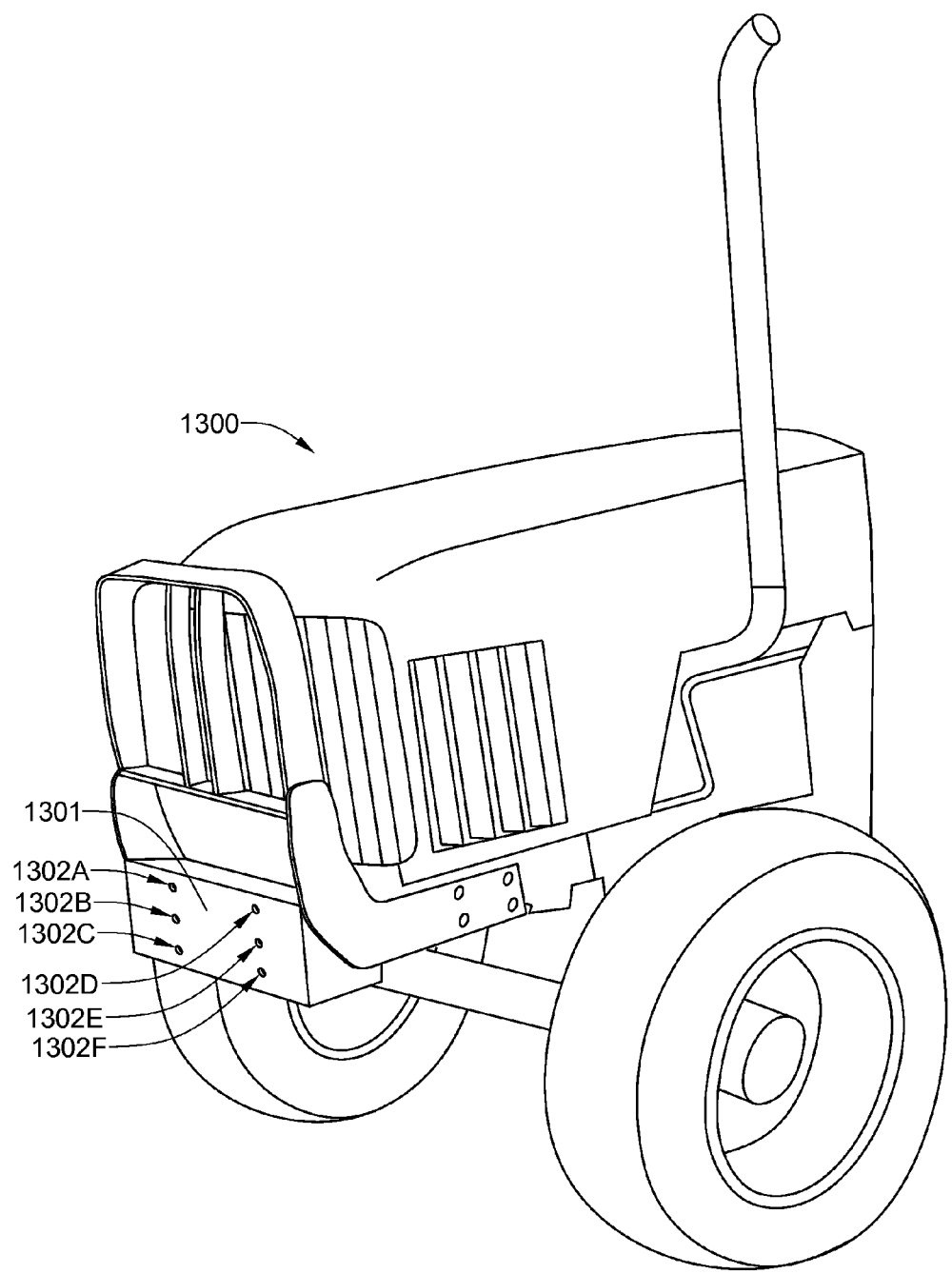
FIG. 13 is a crude drawing of that portion of a John Deere 5520N agricultural tractor anterior to the cab, the tractor having a front frame member to which the three-point front tractor hitch mounts.

Referring now to FIG. 13, a front frame member 1301 of the John Deere 5520N agricultural tractor 1300 has six bolt holes 1302A, 1302B, 1302C, 1302D, 1302E, and 1302F, which align with the six bolt holes 103A, 103B, 103C, 103D, 103E, and 103F in the main backing member 101. A bolt (not shown) is inserted through each pair of aligned bolt holes and the bolt is secured with a nut in order to secure the front hitch assembly 100 to the front frame member 1301. Although only one type of tractor is shown in this disclosure, attachment of the front hitch assembly 100 to front frame of other brands and models of tractors is accomplished in a similar manner.

Although only a single embodiment of the new three-point front hitch mountable to the frame of an agricultural tractor has been disclosed herein, it will be obvious to those having ordinary skill in the art that changes and modifications may be made thereto without departing from the scope and spirit of the invention as hereinafter claimed.

What is claimed is:

1. A three-point front hitch mountable to a front portion of a frame of an agricultural tractor, said three-point hitch comprising:
   a main backing member securable to said front portion;
   an upper hitch-point anchor bracket formed from a first pair of parallel, spaced-apart plates, which are secured to the main backing member, said upper hitch-point anchor bracket providing an upper hitch attachment point for the securing of an upper implement attachment link;
   an A-frame assembly pivotally coupled to the main backing member, said A-frame assembly having a pair of arms which distally diverge, each arm having an implement pivot bushing at its distal end, the implement pivot bushing of each arm being coaxial with the implement pivot bushing of the other arm, said arms having a generally horizontal position when a three-attachment-point implement is secured to the hitch;
   a hydraulic cylinder coupled between the upper hitch-point bracket and the A-frame assembly, said hydraulic cylinder operable to rotate the A-frame assembly through an arc, thereby raising or lowering the implement pivot bushing thereof; and
   a hitch receiver affixed to said A-frame assembly, said hitch receiver projecting downwardly when said A-frame assembly is in a generally horizontal position;
   wherein at least one coupling end of said hydraulic cylinder is pinned to at least one oblong aperture, which provides an amount of play for the A-frame assembly so that an implement mounted to the hitch has a degree of float for accommodating a certain amount of non-planarity of soil over which the mounted implement travels.

2. The three-point front hitch of claim 1, wherein an upper end of said hydraulic cylinder can be pinned to the upper hitch attachment point when an implement is not coupled to the A-frame assembly so that the A-frame assembly can be rotated to a generally vertical position, thereby elevating the hitch receiver to a generally horizontal position for reception of a hitch.

3. The three-point hitch of claim 2, which further comprises a hydraulic cylinder mounting bracket to which the distal end of a slidable piston rod of the hydraulic cylinder is attached and to which the hitch receiver is also secured.

4. The three-point front hitch of claim 3, wherein said hydraulic cylinder mounting bracket can be pinned to the upper hitch-point anchor bracket when the A-frame assembly is in a generally vertical position.

5. The three-point front hitch of claim 1, wherein said A-frame assembly comprises:
   a pivot tube to which each of the arms is welded;
   a brace plate, which is spaced from the pivot tube and welded to each of the arms; and
   a hydraulic cylinder mounting bracket, which is welded to both the pivot tube and to the brace plate.

6. The three-point hitch of claim 5, wherein said A-frame assembly further comprises a receiver mounting plate that is welded to the hydraulic cylinder mounting bracket and to the pivot tube; and
   wherein said hitch receiver is welded to the receiver mounting plate, the pivot tube and to the brace plate; and
   wherein said hitch receiver is positioned generally orthogonal to a plane passing through an axis of the pivot tube and each of the implement pivot bushings.

7. The three-point hitch of claim 5, which further comprises a pair of spaced-apart pivot anchors welded to the main backing member, the pivot tube of said A-frame assembly being rotatably pinned between said pivot anchors by an A-frame assembly pivot rod.

8. The three-point hitch of claim 1, wherein said main backing member is fabricated from a main plate provided with bolt holes for securing the main backing member to the front frame portion of a tractor, a top plate, and a bottom plate, said backing member forming a channel which fits over the front frame portion.

9. The three-point hitch of claim 1, wherein an upper end of said hydraulic cylinder is pinned between a pair of oblong apertures in the spaced-apart plates forming the upper hitch-point anchor bracket.

10. The three-point hitch of claim 9, wherein said each of the spaced-apart plates forming the upper hitch-point anchor bracket if provided with multiple oblong apertures so that mounting of an upper end of the hydraulic cylinder is vertically adjustable.

11. A three-point front hitch mountable to a front portion of a frame of an agricultural tractor, said three-point hitch comprising:
   a main backing member securable to said front portion;
   an upper hitch-point anchor bracket formed from a first pair of parallel, spaced-apart plates, which are secured to the main backing member, said upper hitch-point anchor bracket providing an upper hitch attachment point for the securing of an upper implement attachment link;
   a pair of spaced-apart pivot anchors welded to the main backing member;
   an A-frame assembly having a pivot tube to which each of the arms is welded, a brace plate, which is spaced from the pivot tube and welded to each of the arms, and a hydraulic cylinder mounting bracket formed from a second pair of parallel, spaced-apart plates welded to both the pivot tube and to opposite ends of the brace plate; and
   a hydraulic cylinder coupled between the upper hitch-point bracket and the A-frame assembly, said hydraulic cylinder operable to rotate the A-frame assembly through an arc, thereby raising or lowering the implement pivot bushing thereof;

wherein the arms of the A-frame assembly diverge as they distally extend from the pivot tube, each arm having an implement pivot bushing at its distal end, the implement pivot bushing of each arm being coaxial with the implement pivot bushing of the other arm, said arms having a generally horizontal position when a three-attachment-point implement is secured to the hitch, and said pivot tube being rotatably pinned between said pivot anchors by an A-frame assembly pivot rod; and a hitch receiver affixed to said A-frame assembly, said hitch receiver projecting downwardly when said A-frame assembly is in a generally horizontal position;

wherein at least one coupling end of said hydraulic cylinder is pinned to at least one oblong aperture, which provides an amount of play for the A-frame assembly so that an implement secured to the hitch has a degree of float for accommodating a certain amount of non-planarity of soil over which the mounted implement travels.

12. The three-point front hitch of claim 11, wherein an upper end of said hydraulic cylinder can be pinned to the upper hitch attachment point when an implement is not coupled to the hitch in order to move the A-frame assembly to a generally vertical position, thereby elevating the hitch receiver to a generally horizontal position for reception of a hitch.

13. The three-point hitch of claim 11, wherein said A-frame assembly further comprises a receiver mounting plate that is welded to the hydraulic cylinder mounting bracket and to the pivot tube; and wherein said hitch receiver is welded to the receiver mounting plate, to the pivot tube and the brace plate; and wherein said hitch receiver is positioned generally orthogonal to a plane passing through an axis of the pivot tube and an axis of both implement pivot bushings.

14. The three-point front hitch of claim 13, wherein an upper end of said hydraulic cylinder can be pinned to the upper hitch attachment point when an implement is not coupled to the hitch in order to move the A-frame assembly to a generally vertical position, thereby elevating the hitch receiver to a generally horizontal position for reception of a hitch.

15. The three-point hitch of claim 11 wherein an upper end of said hydraulic cylinder is pinned between a pair of oblong apertures in the spaced-apart plates forming the upper hitch-point anchor bracket.

16. The three-point hitch of claim 15 wherein said each of the spaced-apart plates forming the upper hitch-point anchor bracket if provided with multiple oblong apertures so that mounting of an upper end of the hydraulic cylinder is vertically adjustable.

17. The three-point hitch of claim 12, wherein said hydraulic cylinder mounting bracket can be pinned to the upper hitch-point anchor bracket when the A-frame assembly is in a generally vertical position.

18. The three-point hitch of claim 11, wherein said main backing member is fabricated from a main plate provided with bolt holes for securing the main backing member to the front frame portion of a tractor, a top plate, and a bottom plate, said main backing member forming a channel which fits over the front frame portion.

\* \* \* \* \*